US012148345B2

(12) United States Patent
Wang

(10) Patent No.: US 12,148,345 B2
(45) Date of Patent: Nov. 19, 2024

(54) OVERVOLTAGE COMPENSATION METHOD, OVERVOLTAGE COMPENSATION DEVICE, AND DISPLAY PANEL

(71) Applicant: TCL China Star Optoelectronics Technology Co., Ltd., Guangdong (CN)

(72) Inventor: Qian Wang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 211 days.

(21) Appl. No.: 17/266,657

(22) PCT Filed: Dec. 31, 2020

(86) PCT No.: PCT/CN2020/142306
§ 371 (c)(1),
(2) Date: Sep. 26, 2023

(87) PCT Pub. No.: WO2022/141463
PCT Pub. Date: Jul. 7, 2022

(65) Prior Publication Data

US 2024/0038121 A1 Feb. 1, 2024

(30) Foreign Application Priority Data

Dec. 30, 2020 (CN) ......................... 202011609357.1

(51) Int. Cl.
*G09G 3/20* (2006.01)
*G09G 3/36* (2006.01)

(52) U.S. Cl.
CPC ............. *G09G 3/2007* (2013.01); *G09G 3/36* (2013.01); *G09G 2320/0271* (2013.01); *G09G 2320/045* (2013.01)

(58) Field of Classification Search
CPC ....... G09G 2320/271; G09G 2320/045; G09G 2340/16; G09G 3/2007; G09G 3/36
See application file for complete search history.

(56) References Cited

U.S. PATENT DOCUMENTS

2005/0146495 A1* 7/2005 MacKinnon ......... G09G 3/3611 345/98
2015/0170583 A1* 6/2015 Chen ...................... G09G 3/003 345/89

(Continued)

FOREIGN PATENT DOCUMENTS

CN 1691121 11/2005
CN 1828713 9/2006

(Continued)

*Primary Examiner* — Kenneth Bukowski

(57) ABSTRACT

A overvoltage compensation method for a display panel includes determining a corresponding compensation voltage value according to grayscale values of two adjacent pixels in a same column in a same frame or grayscale values of a same pixel in two adjacent frames, and an overvoltage compensation table, wherein the overvoltage compensation table has a first grayscale value group and a second grayscale value group that both contain all integers in [0,2k), the integers include a plurality of binding point values, and a difference between two adjacent binding point values of the first four binding point values is not greater than 2k−8, wherein k is an integer greater than 8; transmitting the compensation voltage value to the display panel to make the pixel present the second grayscale value.

19 Claims, 4 Drawing Sheets

(56) References Cited

U.S. PATENT DOCUMENTS

| | | | | |
|---|---|---|---|---|
| 2021/0233457 | A1* | 7/2021 | Xiong .................. | G09G 3/2074 |
| 2021/0295789 | A1* | 9/2021 | Kang ................... | G09G 3/3607 |

FOREIGN PATENT DOCUMENTS

| | | | | | |
|---|---|---|---|---|---|
| CN | 101038734 | | | 9/2007 | |
| CN | 101271672 | | | 9/2008 | |
| CN | 101308636 | | | 11/2008 | |
| CN | 103165096 | | | 6/2013 | |
| CN | 103390394 | | | 11/2013 | |
| CN | 106384573 | | | 2/2017 | |
| CN | 106548756 | | | 3/2017 | |
| CN | 108133692 | | | 6/2018 | |
| CN | 108847194 | | | 11/2018 | |
| CN | 108962179 | A | * | 12/2018 | ............... G09G 3/36 |
| CN | 111028761 | | | 4/2020 | |
| CN | 111128077 | | | 5/2020 | |
| KR | 2009-0052237 | | | 5/2009 | |
| TW | 200849204 | | | 12/2008 | |

* cited by examiner

OVERVOLTAGE COMPENSATION METHOD, OVERVOLTAGE COMPENSATION DEVICE, AND DISPLAY PANEL

RELATED APPLICATIONS

This application is a National Phase of PCT Patent Application No. PCT/CN2020/142306 having International filing date of Dec. 31, 2020, which claims the benefit of priority of Chinese Patent Application No. 202011609357.1 filed on Dec. 30, 2020. The contents of the above applications are all incorporated by reference as if fully set forth herein in their entirety.

FIELD AND BACKGROUND OF THE INVENTION

The present invention relates to the field of display technology, in particular, to an overvoltage compensation method, an overvoltage compensation device, and a display panel.

A liquid crystal display (LCD) panel controls a voltage across liquid crystal molecules corresponding to each pixel, so that the liquid crystal molecules twist a corresponding angle to transmit light of a backlight module, thereby generating a picture.

Over drive (OD) technology improves dynamic response of the LCD panel by setting an overvoltage compensation table corresponding to the LCD panel. At present, most of the overvoltage compensation tables with a depth of 8 bits are used to process grayscale values. However, not only will data accuracy be lost when processing grayscale values with a bit width greater than 8 bits, but also in a viewing angle of grayscale values with a bit width of 8 bits, binding points are not set in an incremental manner in a low grayscale region, and the binding points are not set in an incremental manner especially within a grayscale value range of 0-4, causing abnormal transition of a display picture in a low grayscale gradient.

Therefore, it is necessary to provide an overvoltage compensation method, an overvoltage compensation device and a display panel to improve an application accuracy of the overvoltage compensation meter and to relieve transition abnormality of display pictures in the low grayscale gradient.

SUMMARY OF THE INVENTION

The embodiments of the present invention provide an overvoltage compensation method, an overvoltage compensation device, and a display panel. By setting multi-level grayscale values in a first grayscale value group and a second grayscale value group of a overvoltage compensation table to be a plurality of integers arranged in an arithmetic sequence wherein a common difference, a first term, and a last term of the arithmetic sequence are 1, 0, $(2^k-1)$, and in the first four 1st binding point values in the first grayscale value group and the second grayscale value group, a difference between two adjacent 1st binding point values is not greater than $2^{k-8}$, wherein the k is an integer greater than 8; so as to solve a problem of low application accuracy of the existing overvoltage compensation table and abnormal transition of the display picture in the low grayscale gradient.

An embodiment of the present invention provides an overvoltage compensation method applied to a display panel, the overvoltage compensation method comprises:

obtaining a first grayscale value and a second grayscale value, wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, and value ranges of the first grayscale value and the second grayscale value are both integers in $[0, 2^k)$ wherein the k is an integer greater than 8;

determining a corresponding compensation voltage value according to the first grayscale value, the second grayscale value, and an overvoltage compensation table, wherein the overvoltage compensation table comprises a first grayscale value group, a second grayscale value group, and a voltage value group, each of the first grayscale value group and the second grayscale value group comprises multi-level grayscale values, the voltage value group comprises a plurality of voltage values, the multi-level grayscale values in the first grayscale value group and the second grayscale value group are a plurality of integers arranged in an arithmetic sequence wherein a common difference, a first term, and a last term of the arithmetic sequence are 1, 0, $(2^k-1)$, a grayscale value of each level of the multi-level grayscale values in the first grayscale value group is combined with a grayscale value of each level of the multi-level grayscale values in the second grayscale value group to map corresponding voltage values in the voltage value group, a plurality of binding point values are selected from the plurality of integers set at intervals, among the first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group; and transmitting the compensation voltage value to the display panel, so that the same pixel presents the second grayscale value, or the second pixel presents the second grayscale value.

In an embodiment, the k is 10 or 12.

In an embodiment, when the k is 10, the plurality of integers comprise nineteen binding point values set at intervals.

In an embodiment, among the first eighteen binding point values of the nineteen binding point values, a difference between two adjacent binding point values is $2^p$, where p is an integer not less than 0.

In an embodiment, when the k is 10, first five binding point values of the plurality of binding point values are 0, 4, 8, 12, and 16.

In an embodiment, the plurality of binding point values are 0, 4, 8, 12, 16, 32, 64, 128, 192, 256, 384, 448, 512, 576, 608, 640, 768, 896, and 1023 in sequence.

In an embodiment, the step of determining the compensation voltage value according to the first grayscale value, the second grayscale value and the overvoltage compensation table comprises:

determining a corresponding voltage value according to a level of the first grayscale value in the first grayscale value group and a level of the second grayscale value in the second grayscale value group.

In an embodiment, a plurality of interpolated values are selected from the plurality of integers, and the plurality of interpolated values and the plurality of binding point values together form the plurality of integers, a voltage value corresponding to each of the interpolated values in the first grayscale value group and each of the interpolated values in the second grayscale value group is obtained by a linear interpolation with the binding point values of a corresponding part in the first grayscale value group, the binding point values of a corresponding part in the second grayscale value group, and the voltage values of a corresponding part in the voltage value group.

An embodiment of the present invention provides an overvoltage compensation device applied to a display panel, the overvoltage compensation device comprises:

an acquiring module configured to obtain a first grayscale value and a second grayscale value, wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, and value ranges of the first grayscale value and the second grayscale value are both integers in [0, $2^k$) wherein the k is an integer greater than 8;

a processing module configured to determine a corresponding compensation voltage value according to the first grayscale value, the second grayscale value, and an overvoltage compensation table, wherein the overvoltage compensation table comprises a first grayscale value group, a second grayscale value group, and a voltage value group, each of the first grayscale value group and the second grayscale value group comprise multi-level grayscale values, the voltage value group comprises a plurality of voltage values, the multi-level grayscale values in the first grayscale value group and the second grayscale value group are a plurality of integers arranged in an arithmetic sequence wherein a common difference, a first term, and a last term of the arithmetic sequence are 1, 0, ($2^k-1$), a grayscale value of each level of the multi-level grayscale values in the first grayscale value group is combined with a grayscale value of each level of the multi-level grayscale values in the second grayscale value group to map corresponding voltage values in the voltage value group, a plurality of binding point values are selected from the plurality of integers set at intervals, among the first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group; and an output module configured to transmit the compensation voltage value to the display panel, so that the pixel presents the second grayscale value, or the second pixel presents the second grayscale value.

In an embodiment, the processing module is specifically configured to determine a corresponding voltage value according to a level of the first grayscale value in the first grayscale value group and a level of the second grayscale value in the second grayscale value group.

An embodiment of the present invention further provides a display panel comprising a controller and a memory, the controller is configured to execute a number of instructions stored in the memory to implement the method as described in any of the above.

In an embodiment, the display panel is a liquid crystal display panel.

An embodiment of the present invention further provides a storage medium storing a number of instructions, the instructions are configured to be executed by a controller to implement the method as described in any of the above.

The present invention provides an overvoltage compensation method, an overvoltage compensation device, and a display panel. For a first grayscale value and a second grayscale value whose value ranges are both integers in [0, $2^k$), wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, the overvoltage compensation table comprises a first grayscale value group, a second grayscale value group, and a voltage value group. By setting multi-level grayscale values in the first grayscale value group and the second grayscale value group of the overvoltage compensation table to be a plurality of integers arranged in an arithmetic sequence wherein a common difference, a first term, and a last term of the arithmetic sequence are 1, 0, ($2^k-1$), wherein the k is an integer greater than 8; that is, the application accuracy of the overvoltage compensation table is improved by setting the k to greater than 8; a plurality of binding point values are selected from the plurality of integers set at intervals, by setting a difference between two adjacent binding point values in the first four binding point values of the plurality of binding point values to be not greater than $2^{k-8}$, that is, by setting the difference between the two adjacent binding point values in the smaller four binding point values to be no greater than $2^{k-8}$, so that in a viewing angle of grayscale values with a bit width of 8 bits, the binding points within the grayscale value range of 0-4 are set in increments, which relieve the abnormal transition of the display picture in the low grayscale gradient.

BRIEF DESCRIPTION OF THE SEVERAL VIEWS OF THE DRAWINGS

The technical solutions, as well as other beneficial advantages, of the present invention will be apparent from the following detailed descriptions of embodiments of the present invention, with reference to the attached drawings.

DESCRIPTION OF SPECIFIC EMBODIMENTS OF THE INVENTION

The technical solutions in the embodiments of the present invention will be described clearly and completely hereinafter with reference to the accompanying drawings. It is apparent that the described embodiments are only a part of embodiments of the present invention, not all the embodiments. All other embodiments obtained by those skilled in the art based on the embodiments of the present invention belong to the protecting scope of the present invention.

The terms "first", "second", etc. in the present invention are used to distinguish different objects, rather than used to indicate a specified order. Furthermore, the terms "include" and "comprise" as well as any variants thereof are intended to cover a non-exclusive inclusion. For example, a process, method, system, product, or equipment that includes a series of steps or modules is not limited to the listed steps or modules, but may alternatively include unlisted steps or modules, or may also alternatively include other steps or modules inherent to these process, method, product, or equipment.

Reference to "embodiments" herein means that a specific feature, structure, or characteristic described in conjunction with the embodiments may be included in at least one embodiment of the present invention. An appearance of a phrase in various places in the specification does not necessarily refer to the same embodiment, nor is it an independent or alternative embodiment mutually exclusive with other embodiments. Those skilled in the art clearly and implicitly understand that, the embodiments described herein can be combined with other embodiments.

An execution subject of an overvoltage compensation method provided by embodiments of the present invention may be an overvoltage compensation device provided by an embodiment of the present invention or an electronic equipment integrated with the overvoltage compensation device. The overvoltage compensation device can be realized by hardware or software.

The embodiments of the present invention provide an overvoltage compensation method, an overvoltage compensation device, and a display panel. The detailed description will be given below.

An embodiment of the present invention provides an overvoltage compensation method applied to a display panel, and each step of the overvoltage compensation method of the embodiment of the present invention will be described in detail below.

Figure 1:
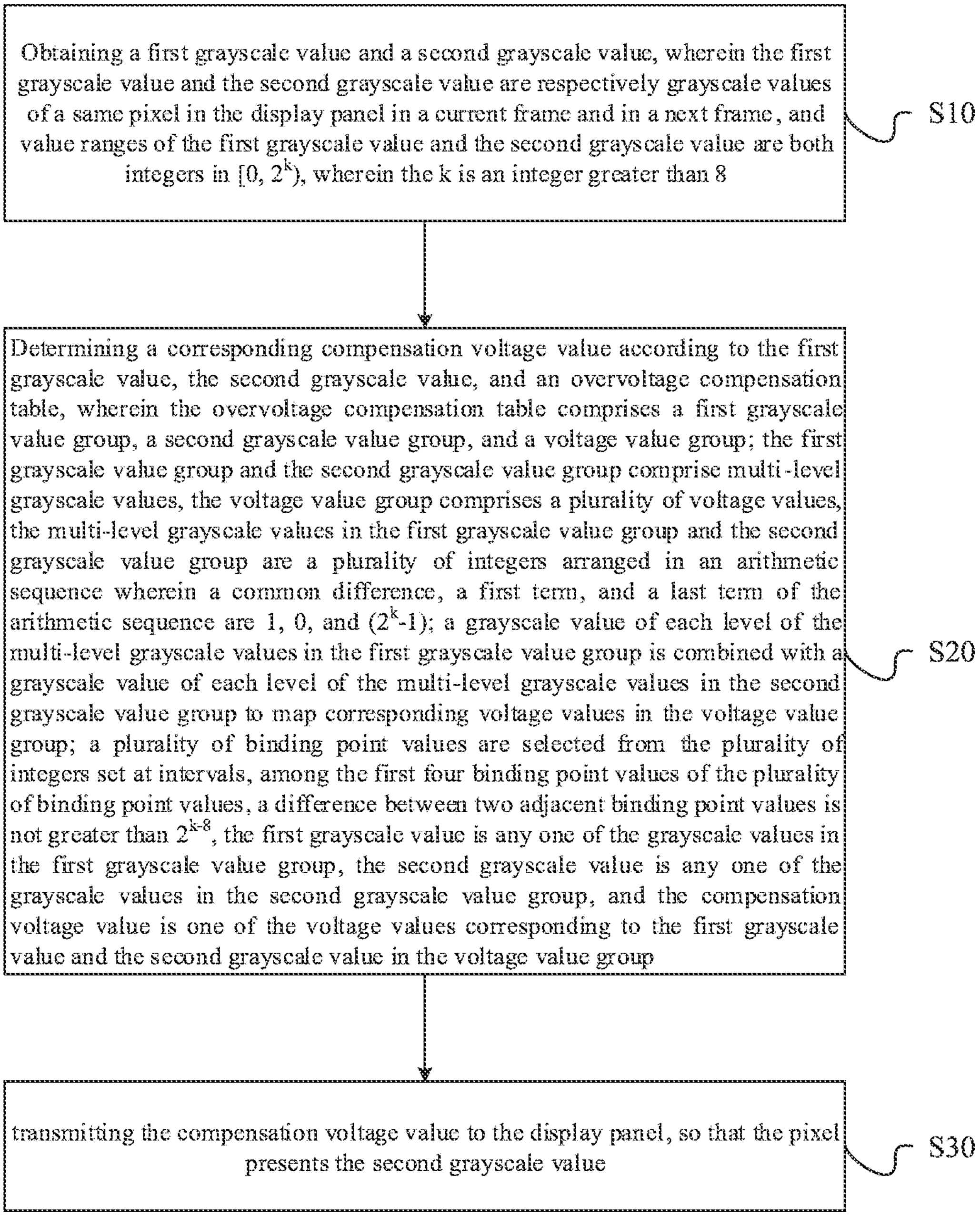
FIG. 1 is a flowchart of an overvoltage compensation method in accordance with an embodiment of the present invention.

In an embodiment, as shown in FIG. 1, the overvoltage compensation method includes, but is not limited to, the following steps.

S10, obtaining a first grayscale value and a second grayscale value, wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, and value ranges of the first grayscale value and the second grayscale value are both integers in $[0, 2^k)$ wherein the k is an integer greater than 8.

When the first grayscale value and the second grayscale value are respectively grayscale values of the same pixel in the display panel in the current frame and in the next frame, for pixels used for grayscale display, the first grayscale value and the second grayscale value can both indicate a black and white degree of the pixel. For example, when the first grayscale value is 0, it means that the pixel is presented as black in this frame. When the second grayscale value is $(2^k-1)$, it means that the pixel is presented as white in the next frame. It can be understood that, for pixels used for pure color display, the pure color refers to a color or hue that is not mixed with other tones. For example, the pure color is red, which means that the pixel is presented as red in any of $2^k$ levels. The first grayscale value and the second grayscale value may both indicate a value corresponding to any one of the $2^k$ levels of the pixel. For example, the pixel being at a $2^4$th level means that the first grayscale value and the second grayscale value are 16.

Similarly, when the first grayscale value and the second grayscale value are respectively grayscale values of the first pixel and the second pixel in the same frame, the first pixel and the second pixel are all electrically connected to the same data line, and the scanning time of the second pixel is later than the scanning time of the first pixel in each frame. When the first grayscale value is 0 and the second grayscale value is $(2^k-1)$, it can indicate that the first pixel is presented as black in this frame, and the second pixel is presented as white in this frame; in the same way, the first grayscale value and the second grayscale value may respectively represent the value corresponding to any of the $2^k$ levels of the first pixel and the value corresponding to any of the $2^k$ levels of the second pixel. For example, if the first pixel and the second pixel are both at the $2^4$th level, it means that the first grayscale value and the second grayscale value are both 16.

The value ranges of the first grayscale value and the second grayscale value are both integers in $[0, 2^k)$ wherein the k is an integer greater than 8. That is, the first grayscale value and the second grayscale value may be any one of 0, 1, 2, . . . , 255, 256, . . . , $(2^k-2)$, $(2^k-1)$ at a different time or at a same time. Specifically, when the first grayscale value and the second grayscale value are respectively the grayscale values of the same pixel in the display panel in the current frame and in the next frame, the first grayscale value can be obtained by reading the grayscale value of the pixel in the current frame or by reading the grayscale value of the pixel in the current frame pre-stored in the display panel. It can be understood that, since the second grayscale value is the grayscale value of the pixel in the display panel in the next frame, the second grayscale value can be obtained by reading the grayscale value of the pixel in the current frame pre-stored in the display panel. Similarly, when the first grayscale value and the second grayscale value are respectively grayscale values of the first pixel and the second pixel in the same frame, the first pixel and the second pixel are all electrically connected to the same data line, and the scanning time of the second pixel is later than the scanning time of the first pixel in each frame, the first grayscale value can be obtained by reading the grayscale value of the first pixel in the current frame, or by reading the grayscale value of the first pixel in the current frame pre-stored in the display panel. Because the scanning time of the second pixel is later than the scanning time of the first pixel, the second grayscale value can be obtained by reading the grayscale value of the second pixel in the current frame pre-stored in the display panel.

S20, determining a corresponding compensation voltage value according to the first grayscale value, the second grayscale value, and an overvoltage compensation table, wherein the overvoltage compensation table comprises a first grayscale value group, a second grayscale value group, and a voltage value group. The first grayscale value group and the second grayscale value group both comprise multi-level grayscale values, the voltage value group comprises a plurality of voltage values, the multi-level grayscale values in the first grayscale value group and the second grayscale value group are a plurality of integers arranged in an arithmetic sequence wherein a common difference, a first term, and a last term of the arithmetic sequence are 1, 0, and $(2^k-1)$. A grayscale value of each level of the multi-level grayscale values in the first grayscale value group is combined with a grayscale value of each level of the multi-level grayscale values in the second grayscale value group to map corresponding voltage values in the voltage value group. A plurality of binding point values are selected from the plurality of integers set at intervals. Among first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group.

The multi-level grayscale values in the first grayscale value group and the multi-level grayscale values in the second grayscale value group are same, and both include a plurality of integers arranged in an arithmetic sequence wherein the common difference of the arithmetic sequence is 1, the first term of the arithmetic sequence is 0, and the last term of the arithmetic sequence is $(2^k-1)$. That is, the multi-level grayscale values in the first grayscale value group and the multi-level grayscale values in the second grayscale value group are all integers of 0, 1, 2, . . . , 255, 256, . . . , $(2^k-2)$, $(2^k-1)$. It can be understood that since the value ranges of the first grayscale value and the second grayscale value are both integers in $[0, 2^k)$, and the multi-level grayscale values in the first grayscale value group and the second grayscale value group are a plurality of integers arranged in an arithmetic sequence wherein a common difference, a first term, and a last term of the arithmetic sequence are 1, 0, and $(2^k-1)$. That is, the value of the first grayscale value is included in the first grayscale value group, and the value of the second grayscale value is included in the second grayscale value group.

A grayscale value of each level of the multi-level grayscale values in the first grayscale value group is combined with a grayscale value of each level of the multi-level grayscale values in the second grayscale value group to map corresponding voltage values in the voltage value group. This means that the grayscale value of each level of the multi-level grayscale values in the first grayscale value group and a grayscale value of any level of the multi-level grayscale values in the second grayscale value group can be mapped to a corresponding voltage value in the voltage value group. Similarly, the grayscale value of each level of the multi-level grayscale values in the second grayscale value group and a grayscale value of any level of the multi-level grayscale values in the first grayscale value group can be mapped to a corresponding voltage value in the voltage value group. Specifically, for example, a voltage value corresponding to the grayscale value P0 in the first grayscale value group and the grayscale value Q0 in the second grayscale value group may be B00, a voltage value corresponding to a grayscale value P1 in the first grayscale value group and a grayscale value Q0 in the second grayscale value group may be B10, and a voltage value corresponding to a grayscale value P0 in the first grayscale value group and a grayscale value Q1 in the second grayscale value group may be B01.

The plurality of binding point values are selected from the plurality of integers set at intervals. This means that the plurality of binding points in the first grayscale value group and the plurality of binding points in the second grayscale value group are same, and they are all a part of integers set at intervals among the plurality of integers; further, among the first four binding point values of the plurality of binding point values, a difference between two adjacent binding point values is not greater than $2^{k-8}$, which means that if arranged in an ascending order, among the four binding point values in the top four of the plurality of binding point values, a difference between two adjacently arranged binding point values is not more than $2^{k-8}$.

Figure 2:
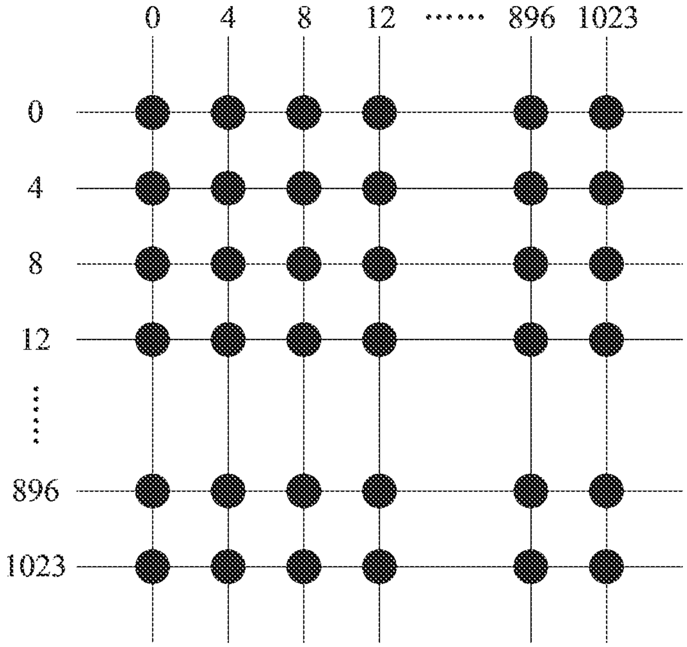
FIG. 2 is a schematic diagram of distribution of first binding point values and second binding point values in the overvoltage compensation method in accordance with an embodiment of the present invention.

Specifically, as shown in FIG. 2, a plurality of values arranged horizontally may represent the plurality of binding point values in the first grayscale value group, and a plurality of values arranged vertically may represent the plurality of binding point values in the second grayscale value group. According to the above-mentioned analysis, when k=10, i.e., the multi-level grayscale values in the first grayscale value group and the multi-level grayscale values in the second grayscale value group are all integers of 0, 1, 2, . . . , 1022, 1023; further, at this time, $2^{k-8}=4$; that is, among the first four binding point values of the plurality of binding point values, a difference between two adjacent binding point values is not greater than 4. For example, the difference is equal to 4; that is, the plurality of binding point values in the first grayscale value group and the plurality of binding point values in the second grayscale value group are all integers including 0, 4, 8, 12, . . . , 896, 1023; it can be known from FIG. 2 that there is a corresponding intersection point at an intersection of a column of each binding point in the first grayscale value group and a corresponding intersection point of a row of each binding point in the second grayscale value group, and the corresponding intersection point means that there is a corresponding voltage value. In addition, according to the above-mentioned analysis, since the grayscale value of each level of the multi-level grayscale values in the first grayscale value group and the grayscale value of any level of the multi-level grayscale values in the second grayscale value group can be mapped to a corresponding voltage value in the voltage value group, and a plurality of the binding point values are selected from multi-level grayscale values; that is, the multi-level grayscale values of the first grayscale value group and the multi-level grayscale values of the second grayscale value group includes a plurality of the binding point values; that is, each binding point value in the first grayscale value group and each binding point value in the second grayscale value group can be mapped to a corresponding voltage value.

In an embodiment, a plurality of interpolated values are selected from the plurality of integers, and the plurality of interpolated values and the plurality of binding point values together form the plurality of integers, a voltage value corresponding to each of the interpolated values in the first grayscale value group and each of the interpolated values in the second grayscale value group is obtained by a linear interpolation with the binding point values of a corresponding part in the first grayscale value group, the binding point values of a corresponding part in the second grayscale value group, and the voltage values of a corresponding part in the voltage value group.

Figure 3:
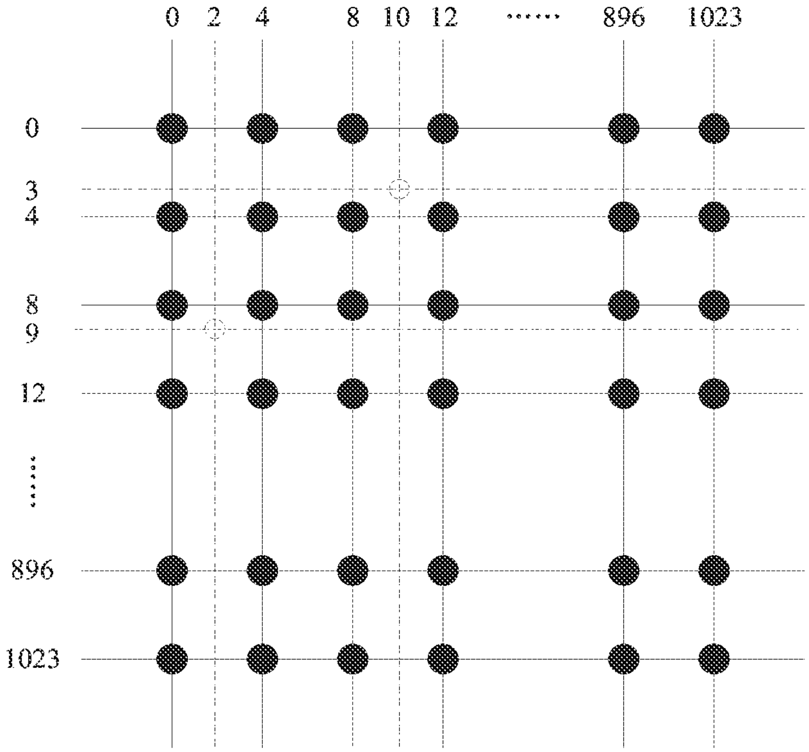
FIG. 3 is a schematic diagram of distribution of a first interpolation and a second interpolation in the overvoltage compensation method in accordance with an embodiment of the present invention.

Specifically, taking as an example k=10 for description, the multi-level grayscale values in the first grayscale value group and the multi-level grayscale values in the second grayscale value group may all be integers of 0, 1, 2, . . . , 1022, 1023, and the plurality of binding point values in the first grayscale value group and the plurality of binding point values in the second grayscale value group may all be integers of 0, 4, 8, 12, . . . , 896, 1023. For the two adjacent binding point values p0 and the binding point value p1 in the first grayscale value group, and the two adjacent binding point value q0 and the binding point value q1 in the second grayscale value group, for example, the binding point value p0 is mapped to a corresponding voltage value b00 and a corresponding voltage value b01 with the binding point value q0 and the binding point value q1 respectively. The point value p1 is mapped to a corresponding voltage value b10 and a corresponding voltage value b11 with the binding point value q0 and the binding point value q1 respectively. If the first grayscale value group has a first interpolated value located between the binding point value p0 and the binding point value p1, and the second grayscale value group has a second interpolated value located between the binding point value q0 and the binding point value q1, a voltage value corresponding to the first interpolated value in the first grayscale value group and the second interpolated value in the second grayscale value group can be obtained by linear interpolation according to the binding point value p0, the binding point value p1, the binding point value q0, the binding point value q1, the corresponding voltage value b00, the corresponding voltage value b01, the corresponding voltage value b10, and the corresponding voltage value b11. For example, as shown in FIG. 3, when the first interpolated value is 10 and the second interpolated value is 3, a column of binding point value 8 and a column of binding point value 12 in the first grayscale value group, and a row of the binding point value 0 and a row of the binding point value 4 in the second grayscale value group are intersected in a two-to-two correspondence, and the intersections correspond to four voltage values. Voltage values corresponding to the first interpolated value and the second interpolated value can be obtained by linear interpolation. Similarly, a voltage value corresponding to the first interpolated value being 2 and the second interpolated value being 9 can be obtained by a linear interpolation with related information of the binding point value 0 and the binding point value 4 in the first grayscale value group and the binding point value 8 and binding point value 12 in the second grayscale value group.

Therefore, according to the binding point values of a corresponding part in the first grayscale value group, the binding point values of a corresponding part in the second grayscale value group, and the voltage values of a corresponding part in the voltage value group, a method of linear interpolation can be used to obtain a plurality of corresponding interpolated values in the first grayscale value group, a plurality of corresponding interpolated values in the second grayscale value group, and a plurality of voltage values corresponding thereto, and finally, the plurality of the binding point values and the plurality of the interpolated values in the first grayscale value group, the plurality of the binding point values and the plurality of the interpolated values in the second grayscale value group, and the plurality of voltage values together constitute the overvoltage compensation table.

In an embodiment, the k is 10 or 12. Specifically, when k is 10, it means that the multi-level grayscale values in the first grayscale value group and the multi-level grayscale values in the second grayscale value group are all integers of 0, 1, 2, . . . , 1022, 1023; among the first four binding point values of the plurality of binding point values, a difference between two adjacent binding point values is not greater than 4. For example, when the difference is equal to 4, i.e., the plurality of binding point values in the first grayscale value group and the plurality of binding point values in the second grayscale value group are all integers of 0, 4, 8, 12, . . . , 896, 1023; similarly, when the k is 12, it means that the multi-level grayscale value in the first grayscale value group and the multi-level grayscale value in the second grayscale value group are all integers of 0, 1, 2, . . . , 1094, 4095, and among the first four binding point values of the plurality of binding point values, a difference between the two adjacent binding point values is not greater than 16. Of course, the difference can still be 4 at this time.

In an embodiment, when the k is 10, the plurality of integers comprise nineteen binding point values set at intervals. Specifically, that means a number of the plurality of binding point values in the second grayscale value group and a number of the plurality of binding point values in the second grayscale value group are both nineteen. For example, the nineteen binding point values can be, but are not limited to, nineteen integers of 0, 4, 8, 12, 16, 32, 64, 128, 192, 256, 384, 448, 512, 576, 608, 640, 768, 896, and 1023. It should be noted that when the k is 10, the plurality of integers may also include nineteen binding point values set at intervals, which can be adjusted according to actual conditions.

Figure 4:
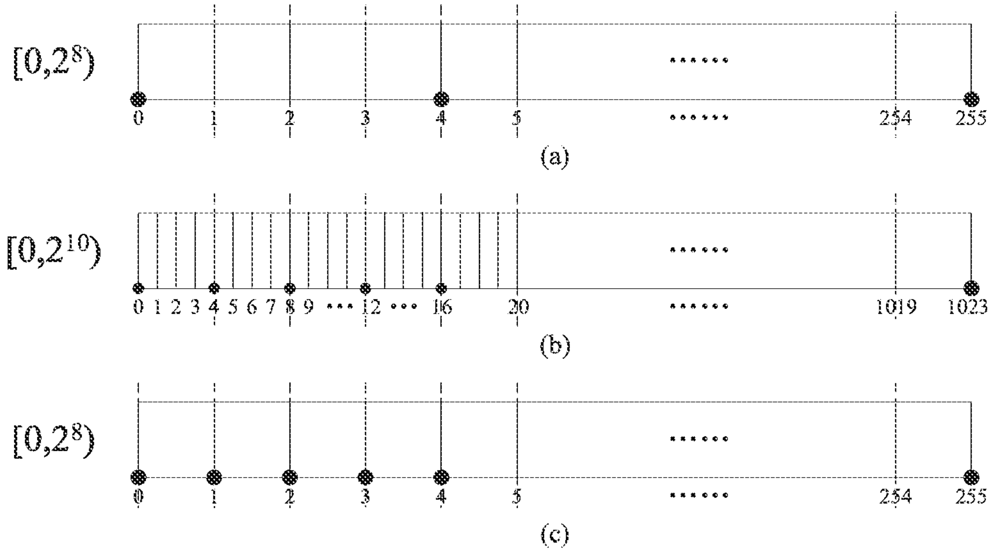
FIG. 4 is a schematic diagram of distribution of binding points in different grayscale classification methods in accordance with an embodiment of the present invention.

It can be understood that, as shown in FIG. 4, when the multi-level grayscale values are all integers in $[0,2^8)$, currently seventeen integers of 0, 4, 8, 16, 24, 32, 48, 64, 96, 112, 128, 144, 152, 160, 192, 224, and 255 are generally selected as the plurality of binding point values; when the multi-level grayscale values are all integers in $[0,2^{10})$, in the present invention, it can select, but are not limited to, the nineteen integers of 0, 4, 8, 12, 16, 32, 64, 128, 192, 256, 384, 448, 512, 576, 608, 640, 768, 896, and 1023 as the plurality of binding point values, that is, the difference between two adjacent binding point values among the first four binding point values 0, 4, 8, and 12 is 4. Specifically, in the overvoltage compensation table of the present invention, the k is an integer greater than 8, which has the following effects when compared to "the multi-level grayscale values are all integers in $[0,2^8)$" above as an example:

On one hand, as shown in FIG. 4, when the multi-level grayscale values are all integers in $[0,2^{10})$, compared to when the multi-level grayscale values are all integers in $[0,2^8)$, a number of levels of the color level of the pixel display divided by the former is 4 times that of the latter. At this time, if the range of obtained grayscale value is an integer in $[2^8, \mathbf{2}^{10})$, the solution in the present invention can be used; that is, a compensation voltage value corresponding to the grayscale value can be directly obtained from the overvoltage compensation table, while the latter first needs to convert the grayscale value into an integer in the range of $[0,2^8)$, and then obtain a corresponding compensation voltage value from the reference overvoltage compensation table in which the range of the grayscale value is an integer in $[0, 2^8)$, thereby causing the latter to lose data accuracy; that is, the former improves the application accuracy of the overvoltage compensation table compared with the latter;

On the other hand, when the multi-level grayscale values are all integers in $[0,2^{10})$, compared to when the multi-level grayscale values are all integers in $[0,2^8)$, as shown in FIGS. 4(*a*) and 4(*b*), the black dot indicates a location of a selected binding point value, a label below the black dot indicates a corresponding binding point value, and a grayscale level presented by a grayscale value being 0, 4, 8, 12, 16, 1023 in sequence in the former solution is theoretically equal to the grayscale level presented by grayscale values being 0, 1, 2, 3, 4, 255 in sequence in the latter solution. Further, as shown in FIG. 4(*a*), the latter selects seventeen grayscale values of 0, 4, 8, 16, 24, . . . , 255 from the $2^8$ grayscale values of 0, 1, 2, 3, 4, . . . , 255 as the plurality of binding point values. As shown in FIG. 4(*b*), the former selects nineteen grayscale values of 0, 4, 8, 12, 16, . . . , 1023 from the $2^{10}$ grayscale values of 0, 1, 2, 3, 4, . . . , 1023 as the plurality of binding point values. According to the above analysis, it can be known that, as shown in FIGS. 4(*a*) and 4(*b*), a grayscale level presented by the grayscale values being 0, 4, 8, 12, 16 in the former are equivalent to a grayscale level presented by the grayscale values being 0, 1, 2, 3, 4 in the latter. Therefore, the latter cannot set the binding points in increments within the grayscale value range of 0-4. From the latter's perspective, as shown in FIG. 4(*c*), in the solution of the present invention, the method of selecting the binding point values is equivalent to selecting grayscale values of 0, 1, 2, 3, and 4 in the latter as the plurality of binding point values; that is, it achieves the latter's viewing angle and set a plurality of corresponding binding point values in increments within the grayscale value range of 0-4, which relieves abnormal transition of the display picture in the low grayscale gradient.

In an embodiment, among first eighteen binding point values of the nineteen binding point values, a difference between two adjacent binding point values is $2^p$, wherein p is an integer not less than 0. Specifically, provided that both the first grayscale value group and the second grayscale value group include nineteen grayscale values, in combination with the above example, the first eighteen binding point values, i.e., the smaller eighteen of the binding point values, are 0, 4, 8, 12, 16, 32, 64, 128, 192, 256, 384, 448, 512, 576, 608, 640, 768, 896 in sequence, the smaller eighteen binding point values all satisfy the condition that the difference between two adjacent binding point values is $2^p$, for example, 4−0=22, 192−128=26, 896−768=27 all meet the above conditions. It can be understood that the last binding point value 1023 among the nineteen binding point values is an odd number, and there is no guarantee that the difference between it and the previous binding point value is $2^p$, but there are a plurality of other binding point values which can be set to satisfy the above conditions, so as to determine the corresponding compensation voltage and facilitate subsequent linear interpolation.

In an embodiment, when the k is 10, first five binding point values of the plurality of binding point values are 0, 4, 8, 12, and 16. According to the description of FIG. 4 above, setting the smaller five of the plurality of binding point values to 0, 4, 8, 12, and 16 in sequence is equivalent to set the grayscale values of 0, 1, 2, 3, 4 to the plurality of corresponding binding point values when the multi-level grayscale values are all integers in $[0,2^8)$, that is, for viewing angle when the multi-level grayscale values are all integers in $[0,2^8)$, it is realized that, the binding point values are set in increments within the grayscale value range of 0-4, which relieves the abnormal transition of the display picture in the low grayscale gradient.

In an embodiment, the step of determining the compensation voltage value according to the first grayscale value, the second grayscale value and the overvoltage compensation table comprises: determining a corresponding voltage value according to a level of the first grayscale value in the first grayscale value group and a level of the second grayscale value in the second grayscale value group. Specifically, according to the above analysis, according to the binding point values of a corresponding part in the first grayscale value group, the binding point values of a corresponding part in the second grayscale value group, and the voltage values of a corresponding part in the voltage value group, a method of linear interpolation can be used to obtain a plurality of corresponding interpolated values in the first grayscale value group, a plurality of corresponding interpolated values in the second grayscale value group, and a plurality of voltage values corresponding thereto. In other words, each of the first grayscale value group and the second grayscale value group includes a plurality of binding point values and a plurality of interpolated values, and the plurality of the binding point values and the plurality of the interpolated values together constitute a plurality of the grayscale values, and a grayscale value of each level of the multi-level grayscale values in the first grayscale value group is combined with a grayscale value of each level of the multi-level grayscale values in the second grayscale value group to map corresponding voltage values in the voltage value group; that is, the first grayscale value and the second grayscale value obtained in step S10 may both be any of the plurality of binding point values and the plurality of interpolated values. As shown in FIG. 2, the "column" where the first grayscale value is located is determined in the first grayscale value group, and a "row" where the second grayscale value is located is determined in the second grayscale value group, and the voltage value corresponding to the intersection of the "column" and the "row" is the compensation voltage value corresponding to the first grayscale value and the second grayscale value.

S30, transmitting the compensation voltage value to the display panel, so that the pixel presents the second grayscale value, or the second pixel presents the second grayscale value.

When the display panel is an LCD panel, it can be understood that, under a control of the compensation voltage value corresponding to the first grayscale value and the second grayscale value, a plurality of liquid crystal molecules corresponding to pixel in the display panel will be deflected by corresponding angles to make the pixel presents as the second grayscale value, or the plurality of liquid crystal molecules corresponding to the second pixel in the display panel will be deflected by a corresponding angle to make the second pixel presents as the second grayscale value. Specifically, after the compensation voltage value and a common voltage are respectively transmitted to the display panel, that is, the voltage corresponding to the compensation voltage value and the common voltage are respectively applied to opposite ends of the plurality of liquid crystal molecules corresponding to the pixel or the second pixel, and are used to drive the plurality of corresponding liquid crystal molecules to deflect, so as to change light transmittance of the display panel, and finally make the pixel or the second pixel present as the second grayscale value.

Specifically, a liquid crystal layer containing a plurality of liquid crystal molecules is located between a common electrode layer and a pixel electrode layer. The common electrode layer may be a continuous film layer, and the pixel electrode layer may include a plurality of pixel electrodes. Each of the pixels or the second pixel has the plurality of corresponding pixel electrodes, the common voltage is applied to the common electrode layer, and the compensation voltage is applied to the source electrode or drain electrode of the thin film transistor corresponding to the corresponding pixel electrode, such that the corresponding pixel electrode has a corresponding output voltage, thus the plurality of corresponding liquid crystal molecules are deflected under an action of the common voltage on the common electrode layer and the output voltage on the corresponding pixel electrode.

In order to better implement the above-mentioned method, in an embodiment, a picture transition device is provided.

Figure 5:
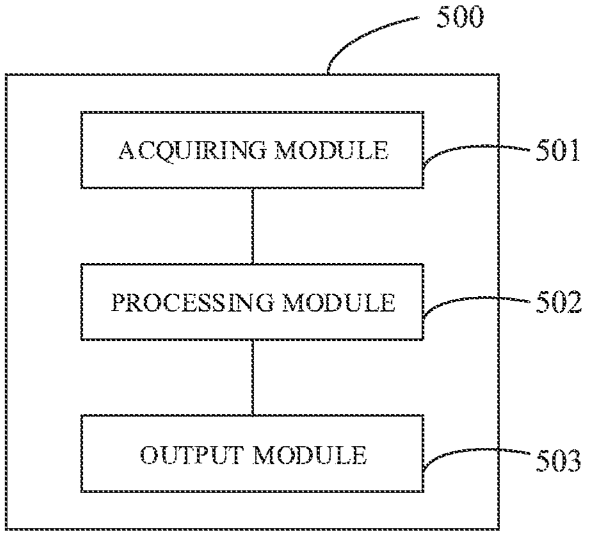
FIG. 5 is a schematic structural diagram of an overvoltage compensation device in accordance with an embodiment of the present invention.

Referring to FIG. 5, FIG. 5 is a schematic structural diagram of an overvoltage compensation device in accordance with an embodiment of the present invention. An overvoltage compensation device of an embodiment is applied to a display panel, a specific description of the overvoltage compensation device of this embodiment is as follows.

In an embodiment, the overvoltage compensation device 500 may comprise:

An acquiring module 501 configured to obtain a first grayscale value and a second grayscale value, wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, and value ranges of the first grayscale value and the second grayscale value are both integers in $[0, 2^k)$ wherein the k is an integer greater than 8.

When the first grayscale value and the second grayscale value are respectively grayscale values of the same pixel in the display panel in the current frame and in the next frame, for pixels used for grayscale display, the first grayscale value and the second grayscale value can both indicate a black and white degree of the pixel. For example, when the first grayscale value is 0, it means that the pixel is presented as black in this frame. When the second grayscale value is $(2^k-1)$, it means that the pixel is presented as white in the next frame. It can be understood that, for pixels used for pure color display, the pure color refers to a color or hue that is not mixed with other tones. For example, the pure color is red, which means that the pixel is presented as red in any of $2^k$ levels. The first grayscale value and the second grayscale value may both indicate a value corresponding to any one of a $2^k$ levels of the pixel. For example, the pixel being at the $2^4$th level means that the first grayscale value and the second grayscale value are 16.

Similarly, when the first grayscale value and the second grayscale value are respectively grayscale values of the first pixel and the second pixel in the same frame, the first pixel and the second pixel are all electrically connected to the same data line, and the scanning time of the second pixel is later than the scanning time of the first pixel in each frame, when the first grayscale value is 0 and the second grayscale value is $(2^k-1)$, which can indicate that the first pixel is presented as black in this frame, and the second pixel is presented as white in this frame; in the same way, the first grayscale value and the second grayscale value may respectively represent the value corresponding to any of the $2^k$ levels of the first pixel and the value corresponding to any of the $2^k$ levels of the second pixel. For example, if the first pixel and the second pixel are both at the $2^4$th level, it means that the first grayscale value and the second grayscale value are both 16.

The value ranges of the first grayscale value and the second grayscale value are both integers in $[0, 2^k)$ wherein the k is an integer greater than 8. That is, the first grayscale value and the second grayscale value may be any one of 0, 1, 2, . . . 255, 256, . . . $(2^k-2)$, $(2^k-1)$ at a different time or at a same time. Specifically, when the first grayscale value and the second grayscale value are respectively the grayscale value of the same pixel in the display panel in the current frame and in the next frame, the first grayscale value can be obtained by reading the grayscale value of the pixel in the current frame or by reading the grayscale value of the pixel in the current frame pre-stored in the display panel with the acquiring module 501. It can be understood that, since the second grayscale value is the grayscale value of the pixel in the display panel in the next frame, the second grayscale value can be obtained by reading the grayscale value of the pixel in the current frame pre-stored in the display panel with the acquiring module 501. Similarly, when the first grayscale value and the second grayscale value are respectively grayscale values of the first pixel and the second pixel in the same frame, the first pixel and the second pixel are all electrically connected to the same data line, and the scanning time of the second pixel is later than the scanning time of the first pixel in each frame, the first grayscale value can be obtained by reading the grayscale value of the first pixel in the current frame, or by reading the grayscale value of the first pixel in the current frame pre-stored in the display panel with the acquiring module 501. Because the scanning time of the second pixel is later than the scanning time of the first pixel, the second grayscale value can be obtained by reading the grayscale value of the second pixel in the current frame pre-stored in the display panel with the acquiring module 501.

A processing module 502 configured to determine a corresponding compensation voltage value according to the first grayscale value, the second grayscale value, and an overvoltage compensation table, wherein the overvoltage compensation table comprises a first grayscale value group, a second grayscale value group, and a voltage value group, each of the first grayscale value group and the second grayscale value group comprises multi-level grayscale values, the voltage value group comprises a plurality of voltage values, the multi-level grayscale values in the first grayscale value group and the second grayscale value group are a plurality of integers arranged in an arithmetic sequence wherein a common difference, a first term, and a last term of the arithmetic sequence are 1, 0, and $(2^k-1)$, a grayscale value of each level of the multi-level grayscale values in the first grayscale value group is combined with a grayscale value of each level of the multi-level grayscale values in the second grayscale value group to map corresponding voltage values in the voltage value group, a plurality of binding point values are selected from the plurality of integers set at intervals, among the first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group.

The multi-level grayscale values in the first grayscale value group and the multi-level grayscale values in the second grayscale value group are same, and both include a plurality of integers arranged in an arithmetic sequence wherein the common difference of the arithmetic sequence is 1, the first term of the arithmetic sequence is 0, and the last term of the arithmetic sequence is $(2^k-1)$, which means that the multi-level grayscale values in the first grayscale value group and the multi-level grayscale values in the second grayscale value group are all integers of 0, 1, 2, . . . , 255, 256, . . . , $(2^k-2)$, $(2^k-1)$. It can be understood that, since the value ranges of the first grayscale value and the second grayscale value are both integers in $[0, 2^k)$, and the multi-level grayscale values in the first grayscale value group and the second grayscale value group are a plurality of integers arranged in an arithmetic sequence wherein a common difference, a first term, and a last term of the arithmetic sequence are 1, 0, and $(2^k-1)$. That is, the value of the first grayscale value is included in the first grayscale value group, and the value of the second grayscale value is included in the second grayscale value group.

A grayscale value of each level of the multi-level grayscale values in the first grayscale value group is combined with a grayscale value of each level of the multi-level grayscale values in the second grayscale value group to map corresponding voltage values in the voltage value group. This means that, the grayscale value of each level of the multi-level grayscale values in the first grayscale value group and the grayscale value of any level of the multi-level grayscale values in the second grayscale value group can be mapped to a corresponding voltage value in the voltage value group. Similarly, the grayscale value of each level of the multi-level grayscale values in the second grayscale value group and a grayscale value of any level of the multi-level grayscale values in the first grayscale value group can be mapped to a corresponding voltage value in the voltage value group. Specifically, for example, a voltage value corresponding to the grayscale value P0 in the first grayscale value group and the grayscale value Q0 in the second grayscale value group may be B00, a voltage value corresponding to the grayscale value P1 in the first grayscale value group and the grayscale value Q0 in the second grayscale value group may be B10, and a voltage value corresponding to the grayscale value P0 in the first grayscale value group and the grayscale value Q1 in the second grayscale value group may be B01.

The plurality of binding point values are selected from the plurality of integers set at intervals. This means that the plurality of binding points in the first grayscale value group and the plurality of binding points in the second grayscale value group are same, and they are all a part of integers set at intervals among the plurality of integers; further, among the first four binding point values of the plurality of binding point values, a difference between two adjacent binding point values is not greater than $2^{k-8}$, which means that if arranged in ascending order, among the four binding point values in the top four of the plurality of binding point values, a difference between two adjacently arranged binding point values is not more than $2^{k-8}$.

Specifically, taking as an example k=10 for description, the multi-level grayscale values in the first grayscale value group and the multi-level grayscale values in the second grayscale value group may all be integers of 0, 1, 2, . . . , 1022, 1023, and the plurality of binding point values in the first grayscale value group and the plurality of binding point values in the second grayscale value group may all be integers of 0, 4, 8, 12, . . . , 896, 1023. For the two adjacent binding point values p0 and the binding point value p1 in the first grayscale value group, and the two adjacent binding point value q0 and the binding point value q1 in the second grayscale value group, for example, the binding point value p0 is mapped to a corresponding voltage value b00 and a corresponding voltage value b01 with the binding point value q0 and the binding point value q1 respectively. The binding point value p1 is mapped to a corresponding voltage value b10 and a corresponding voltage value b11 with the binding point value q0 and the binding point value q1 respectively. If the first grayscale value group has a first interpolated value located between the binding point value p0 and the binding point value p1, and the second grayscale value group has a second interpolated value located between the binding point value q0 and the binding point value q1, a voltage value corresponding to the first interpolated value in the first grayscale value group and the second interpolated value in the second grayscale value group can be obtained by linear interpolation according to the binding point value p0, the binding point value p1, the binding point value q0, the binding point value q1, the corresponding voltage value b00, the corresponding voltage value b01, the corresponding voltage value b10, and the corresponding voltage value b11. For example, as shown in FIG. 3, when the first interpolated value is 10 and the second interpolated value is 3, a column of binding point value 8 and a column of binding point value 12 in the first grayscale value group, and a row of the binding point value 0 and a row of the binding point value 4 in the second grayscale value group are intersect in two-by-two, and the intersections are corresponding to four voltage values, voltage values corresponding to the first interpolated value and the second interpolated value can be obtained by linear interpolation. Similarly, a voltage value corresponding to the first interpolated value being 2 and the second interpolated value being 9 can be obtained by a linear interpolation with related information of the binding point value 0, the binding point value 4 in the first grayscale value group, and the binding point value 8, binding point value 12 in the second grayscale value group.

Therefore, according to the binding point values of a corresponding part in the first grayscale value group, the binding point values of a corresponding part in the second grayscale value group, and the voltage values of a corresponding part in the voltage value group, a method of linear interpolation can be used to obtain a plurality of corresponding interpolated values in the first grayscale value group, a plurality of corresponding interpolated values in the second grayscale value group, and a plurality of voltage values corresponding thereto, and finally, the plurality of the binding point values and the plurality of the interpolated values in the first grayscale value group, the plurality of the binding point values and the plurality of the interpolated values in the second grayscale value group, and the plurality of voltage values together constitute the overvoltage compensation table.

In an embodiment, the processing module 502 is specifically configured to determine a corresponding voltage value according to a level of the first grayscale value in the first grayscale value group and a level of the second grayscale value in the second grayscale value group. Specifically, according to the above analysis, according to the binding point values of a corresponding part in the first grayscale value group, the binding point values of a corresponding part in the second grayscale value group, and the voltage values of a corresponding part in the voltage value group, a method of linear interpolation can be used to obtain a plurality of corresponding interpolated values in the first grayscale value group, a plurality of corresponding interpolated values in the second grayscale value group, and a plurality of voltage values corresponding thereto. In other words, each of the first grayscale value group and the second grayscale value group includes a plurality of the binding point values and a plurality of interpolated values, and the plurality of the binding point values and the plurality of the interpolated values together constitute a plurality of the grayscale values, and a grayscale value of each level of the multi-level grayscale values in the first grayscale value group is combined with a grayscale value of each level of the multi-level grayscale values in the second grayscale value group to map corresponding voltage values in the voltage value group, that is, the first grayscale value and the second grayscale value obtained in step S10 may both be any of the plurality of binding point values and the plurality of interpolated values. As shown in FIG. 2, the “column” where the first grayscale value is located is determined in the first grayscale value group, and a “row” where the second grayscale value is located is determined in the second grayscale value group, and the voltage value corresponding to the intersection of the “column” and the “row” is the compensation voltage value corresponding to the first grayscale value and the second grayscale value.

An output module 503 configured to transmit the compensation voltage value to the display panel, so that the pixel presents the second grayscale value, or the second pixel presents the second grayscale value.

When the display panel is an LCD panel, it can be understood that, under a control of the compensation voltage value corresponding to the first grayscale value and the second grayscale value, a plurality of liquid crystal molecules corresponding to pixel in the display panel will be deflected by corresponding angles to make the pixel presents as the second grayscale value, or the plurality of liquid crystal molecules corresponding to the second pixel in the display panel will be deflected by a corresponding angle to make the second pixel presents as the second grayscale value. Specifically, after the compensation voltage value and a common voltage are respectively transmitted to the display panel, that is, the voltage corresponding to the compensation voltage value and the common voltage are respectively applied to opposite ends of the plurality of liquid crystal molecules corresponding to the pixel or the second pixel, and are used to drive the plurality of corresponding liquid crystal molecules to deflect, so as to change light transmittance of the display panel, and finally make the pixel or the second pixel present as the second grayscale value.

Specifically, a liquid crystal layer containing a plurality of liquid crystal molecules is located between a common electrode layer and a pixel electrode layer. The common electrode layer may be a continuous film layer, and the pixel electrode layer may include a plurality of pixel electrodes. Each of the pixels or the second pixel has the plurality of corresponding pixel electrodes, the common voltage is applied to the common electrode layer, and the compensation voltage is applied to the source electrode or drain electrode of the thin film transistor corresponding to the corresponding pixel electrode by the output module 503, such that the corresponding pixel electrode has a corresponding output voltage, thus the plurality of corresponding liquid crystal molecules are deflected under an action of the common voltage on the common electrode layer and the output voltage on the corresponding pixel electrode.

The present invention further provides a display panel comprising a controller and a memory, the controller is configured to execute a number of instructions stored in the memory to implement the method as described in any of the above-mentioned overvoltage compensation methods.

Figure 6:
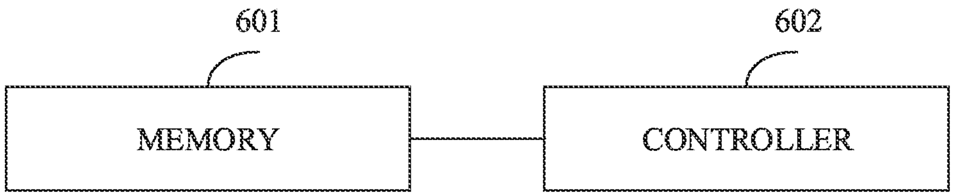
FIG. 6 is a schematic structural diagram of a controller and a memory in a display panel in accordance with an embodiment of the present invention.

In an embodiment, the display panel further includes a controller and a memory. Referring to FIG. 6, FIG. 6 is a schematic structural diagram of a controller and a memory in a display panel in accordance with an embodiment of the present invention.

The memory 601 can be used to store software programs and modules, and it can mainly include a program storage region and a data storage region. The controller 602 executes various functional applications and data processing by running software programs and modules stored in the memory 601.

The controller 602 executes various functions and processes data by running or executing software programs and/or modules stored in the memory 601, and calling data stored in the memory 601, thereby performing overall monitoring.

In some embodiments, the controller 602 obtains a first grayscale value and a second grayscale value, the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, and value ranges of the first grayscale value and the second grayscale value are both integers in $[0, 2^k)$ wherein the k is an integer greater than 8.

In some embodiments, the controller 602 determines a corresponding compensation voltage value according to the first grayscale value, the second grayscale value, and an overvoltage compensation table, wherein the overvoltage compensation table comprises a first grayscale value group, a second grayscale value group, and a voltage value group; each of the first grayscale value group and the second grayscale value group comprises multi-level grayscale values; the voltage value group comprises a plurality of voltage values; the multi-level grayscale values in the first grayscale value group and the second grayscale value group are a plurality of integers arranged in an arithmetic sequence wherein a common difference, a first term, and a last term of the arithmetic sequence are 1, 0, and $(2^k-1)$, a grayscale value of each level of the multi-level grayscale values in the first grayscale value group is combined with a grayscale value of each level of the multi-level grayscale values in the second grayscale value group to map corresponding voltage values in the voltage value group, a plurality of binding point values are selected from the plurality of integers set at intervals, among the first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group.

Specifically, the controller 602 determine a corresponding voltage value according to a level of the first grayscale value in the first grayscale value group and a level of the second grayscale value in the second grayscale value group.

In some embodiments, the controller 602 transmits the compensation voltage value to the display panel, so that the pixel presents the second grayscale value, or the second pixel presents the second grayscale value.

In an embodiment, the present invention further provides a storage medium storing a number of instructions, the instructions are configured to be executed by a controller to implement the overvoltage compensation method as described in any of the above. It should be noted that those skilled in the art can understand that all or part of the steps in the various methods of the above-mentioned embodiments can be completed by a program instructing relevant hardware, and the program can be stored in a computer-readable storage medium, such as been stored in a memory of an electronic equipment and executed by at least one processor in the electronic equipment. The process of execution may include a process of an embodiment of a charging reminding method. The storage medium may include: read only memory (ROM), random access memory (RAM), magnetic disks, or optical disks, etc.

The present invention provides an overvoltage compensation method, an overvoltage compensation device, and a display panel. For a first grayscale value and a second grayscale value whose value ranges are both integers in [0, $2^k$), the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, and a scanning time of the second pixel is later than a scanning time of the first pixel in each frame, the overvoltage compensation table comprises a first grayscale value group, a second grayscale value group, and a voltage value group. By setting multi-level grayscale values in the first grayscale value group and the second grayscale value group of the overvoltage compensation table to comprise a plurality of integers arranged in an arithmetic sequence wherein a common difference, a first term, and a last term of the arithmetic sequence are 1, 0, and ($2^k$−1), wherein the k is an integer greater than 8; that is, the application accuracy of the overvoltage compensation table is improved by setting the k to greater than 8; a plurality of binding point values are selected from the plurality of integers set at intervals, by setting a difference between two adjacent binding point values in first four binding point values of the plurality of binding point values to be not greater than $2^{k-8}$, that is, by setting the difference between the two adjacent binding point values in the smaller four binding point values to be no greater than $2^{k-8}$, so that in a viewing angle of grayscale values with a bit width of 8 bits, the binding points within the grayscale value range of 0-4 are set in increments, which relieve the abnormal transition of the display picture in the low grayscale gradient.

The overvoltage compensation method, the overvoltage compensation device, and the display panel provided by the embodiments of the present invention are described in detail above. Each functional module can be integrated into a processing chip, or each module can exist alone physically, or two or more than two modules are integrated in one module. The above-mentioned integrated modules can be implemented in the form of hardware, or can be implemented in the form of software functional modules. The principle and implementations of the present invention are described in this specification by using specific examples. The description about the foregoing embodiments is merely provided to help understand the method and core ideas of the present invention. In addition, those skilled in the art can make modifications in terms of the specific implementations and application scopes according to the ideas of the present invention. Therefore, the content of this specification shall not be construed as a limit to the present invention.

What is claimed is:

1. An overvoltage compensation method applied to a display panel, wherein the overvoltage compensation method comprises:

obtaining a first grayscale value and a second grayscale value, wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, a scanning time of the second pixel is later than a scanning time of the first pixel in each frame, and value ranges of the first grayscale value and the second grayscale value are both integers in [0, $2^k$), wherein the k is an integer greater than 8;

determining a corresponding compensation voltage value according to the first grayscale value, the second grayscale value, and an overvoltage compensation table, wherein the overvoltage compensation table comprises a first grayscale value group, a second grayscale value group, and a voltage value group; the first grayscale value group and the second grayscale value group comprise multi-level grayscale values, the voltage value group comprises a plurality of voltage values, the multi-level grayscale values in the first grayscale value group and the second grayscale value group are a plurality of integers arranged in an arithmetic sequence wherein a common difference, a first term, and a last term of the arithmetic sequence are 1, 0, and ($2^k$−1); a grayscale value of each level of the multi-level grayscale values in the first grayscale value group is combined with a grayscale value of each level of the multi-level grayscale values in the second grayscale value group to map corresponding voltage values in the voltage value group; a plurality of binding point values are selected from the plurality of integers set at intervals, among the first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group; and transmitting the compensation voltage value to the display panel, so that the same pixel presents the second grayscale value, or the second pixel presents the second grayscale value.

2. The overvoltage compensation method as claimed in claim 1, wherein the k is 10 or 12.

3. The overvoltage compensation method as claimed in claim 2, wherein when the k is 10, the plurality of integers comprise nineteen binding point values set at intervals.

4. The overvoltage compensation method as claimed in claim 3, wherein among the first eighteen binding point values of the nineteen binding point values, a difference between two adjacent binding point values is 2p, wherein p is an integer not less than 0.

5. The overvoltage compensation method as claimed in claim 2, wherein when the k is 10, first five binding point values of the plurality of binding point values are 0, 4, 8, 12, and 16.

6. The overvoltage compensation method as claimed in claim 5, wherein the plurality of binding point values are 0, 4, 8, 12, 16, 32, 64, 128, 192, 256, 384, 448, 512, 576, 608, 640, 768, 896, and 1023 in sequence.

7. The overvoltage compensation method as claimed in claim 1, wherein the step of determining the compensation voltage value according to the first grayscale value, the second grayscale value, and the overvoltage compensation table comprises:

determining a corresponding voltage value according to a level of the first grayscale value in the first grayscale value group and a level of the second grayscale value in the second grayscale value group.

8. The overvoltage compensation method as claimed in claim 1, wherein a plurality of interpolated values are selected from the plurality of integers, and the plurality of interpolated values and the plurality of binding point values together form the plurality of integers, a voltage value corresponding to each of the interpolated values in the first grayscale value group and each of the interpolated values in the second grayscale value group is obtained by a linear interpolation with the binding point values of a corresponding part in the first grayscale value group, the binding point values of a corresponding part in the second grayscale value group, and the voltage values of a corresponding part in the voltage value group.

9. A display panel comprising a controller and a memory, wherein the controller is configured to execute a number of instructions stored in the memory to implement the method according to claim 1.

10. The display panel as claimed in claim 9, wherein the display panel is a liquid crystal display panel.

11. The display panel as claimed in claim 9, wherein the k is 10 or 12.

12. The display panel as claimed in claim 11, wherein when the k is 10, the plurality of integers comprise nineteen binding point values set at intervals.

13. The display panel as claimed in claim 12, wherein among the first eighteen binding point values of the nineteen binding point values, a difference between two adjacent binding point values is 2p, wherein p is an integer not less than 0.

14. The display panel as claimed in claim 11, wherein when the k is 10, first five binding point values of the plurality of binding point values are 0, 4, 8, 12, and 16.

15. The display panel as claimed in claim 14, wherein the plurality of binding point values are 0, 4, 8, 12, 16, 32, 64, 128, 192, 256, 384, 448, 512, 576, 608, 640, 768, 896, and 1023 in sequence.

16. The display panel as claimed in claim 9, wherein the step of determining the compensation voltage value according to the first grayscale value, the second grayscale value, and the overvoltage compensation table comprises:

determining a corresponding voltage value according to a level of the first grayscale value in the first grayscale value group and a level of the second grayscale value in the second grayscale value group.

17. The display panel as claimed in claim 9, wherein a plurality of interpolated values are selected from the plurality of integers, and the plurality of interpolated values and the plurality of binding point values together form the plurality of integers, a voltage value corresponding to each of the interpolated values in the first grayscale value group and each of the interpolated values in the second grayscale value group is obtained by a linear interpolation with the binding point values of a corresponding part in the first grayscale value group, the binding point values of a corresponding part in the second grayscale value group, and the voltage values of a corresponding part in the voltage value group.

18. An overvoltage compensation device applied to a display panel, wherein the overvoltage compensation device comprises circuits implementing modules including:

an acquiring module configured to obtain a first grayscale value and a second grayscale value, wherein the first grayscale value and the second grayscale value are respectively grayscale values of a same pixel in the display panel in a current frame and in a next frame, or the first grayscale value and the second grayscale value are respectively grayscale values of a first pixel and a second pixel in a same frame wherein the first pixel and the second pixel are both electrically connected to a same data line, a scanning time of the second pixel is later than a scanning time of the first pixel in each frame, and value ranges of the first grayscale value and the second grayscale value are both integers in $[0, 2^k)$, wherein the k is an integer greater than 8;

a processing module configured to determine a corresponding compensation voltage value according to the first grayscale value, the second grayscale value, and an overvoltage compensation table, wherein the overvoltage compensation table comprises a first grayscale value group, a second grayscale value group, and a voltage value group; the first grayscale value group and the second grayscale value group comprise multi-level grayscale values, the voltage value group comprises a plurality of voltage values, the multi-level grayscale values in the first grayscale value group and the second grayscale value group are a plurality of integers arranged in an arithmetic sequence wherein a common difference, a first term, and a last term of the arithmetic sequence are 1, 0, and $(2^k-1)$; a grayscale value of each level of the multi-level grayscale values in the first grayscale value group is combined with a grayscale value of each level of the multi-level grayscale values in the second grayscale value group to map corresponding voltage values in the voltage value group; a plurality of binding point values are selected from the plurality of integers set at intervals, among the first four binding point values of the plurality of binding point values, a difference between two adjacent binding point values is not greater than $2^{k-8}$, the first grayscale value is any one of the grayscale values in the first grayscale value group, the second grayscale value is any one of the grayscale values in the second grayscale value group, and the compensation voltage value is one of the voltage values corresponding to the first grayscale value and the second grayscale value in the voltage value group; and an output module configured to transmit the compensation voltage value to the display panel, so that the pixel presents the second grayscale value, or the second pixel presents the second grayscale value.

19. The overvoltage compensation device as claimed in claim 18, wherein the processing module is specifically configured to determine a corresponding voltage value according to a level of the first grayscale value in the first grayscale value group and a level of the second grayscale value in the second grayscale value group.

* * * * *